July 9, 1929.  J. S. REID  1,720,348

OIL CUP STRUCTURE

Filed Oct. 13, 1926

Inventor
James S. Reid
By Brockett & Hyde
Attorneys

Patented July 9, 1929.

1,720,348

UNITED STATES PATENT OFFICE.

JAMES S. REID, OF CLEVELAND, OHIO, ASSIGNOR, BY MESNE ASSIGNMENTS, TO THE EATON AXLE & SPRING COMPANY, OF CLEVELAND, OHIO, A CORPORATION OF OHIO.

OIL-CUP STRUCTURE.

Application filed October 13, 1926. Serial No. 141,343.

This invention relates to improvements in oil cup structures and particularly, oil cup structures especially adapted for the lubrication of vehicle springs of the composite or multiple leaf type.

The object of the present invention is the provision of an improved oil cup structure provided with integral means for enabling the structure to be removably mounted upon a vehicle spring by snap engagement, thereby avoiding the necessity of perforating or otherwise deforming the spring or of providing separate securing means, such as screws or bolts and nuts; which oil cup structure includes an oil transmitting member of felt or other similar material, the parts of the structure being so arranged that said oil transmitting member is not unduly compressed by the pressure of the metal parts; and which oil cup structure is of simple and inexpensive form.

Further objects of the invention are in part obvious and in part will appear more in detail hereinafter.

Figure 1:
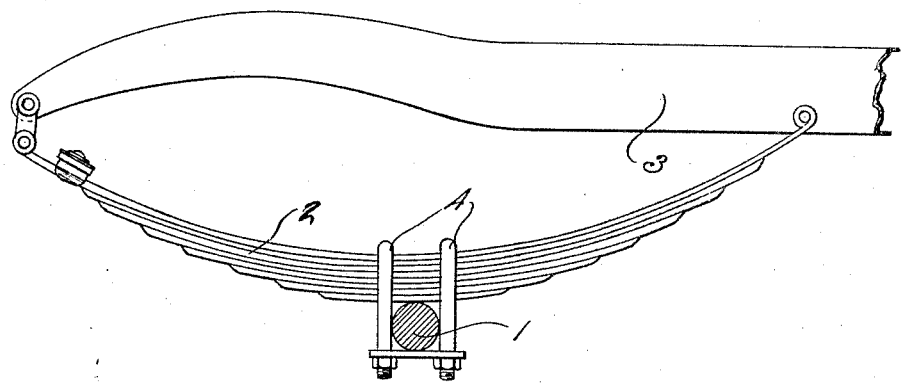
Figure 2:
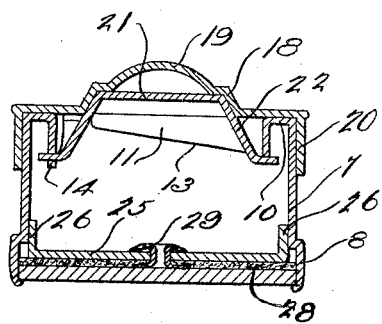
Figure 3:
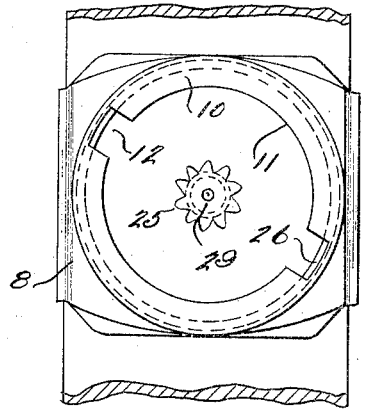
Figure 4:
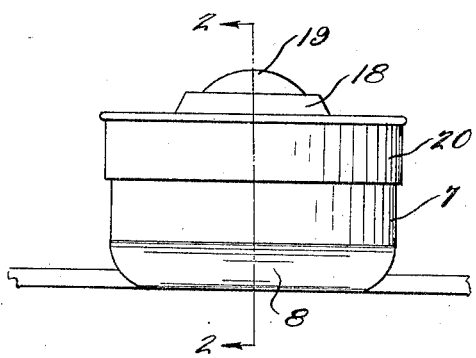

Referring to the drawings, Fig. 1 is a side elevation of the front end of a vehicle frame with my improved oil cup structure mounted upon a vehicle spring; Fig. 2 is a detail vertical sectional view of the oil cup structure taken on the line 2—2, Fig. 4; Fig. 3 is a detail plan view of the oil cup structure with the closure removed; and Fig. 4 is a side elevation of the oil cup structure.

In the drawings, 1 represents the front axle of a motor vehicle, upon which axle is mounted, through the medium of a composite or multiple leaf spring 2, the running gear frame 3 of the vehicle, said spring being secured to the frame in the usual way and being secured to the axle by the usual U-bolts 4.

Mounted upon one end portion of said spring, such as the front end portion, is my improved oil cup structure, from which oil will flow by gravity to the several leaves of the spring, as will readily be understood. For purposes of illustration, the body portion of the oil cup structure and the closure therefor are shown as being of substantially the same construction as disclosed in my prior patent for closures, No. 1,593,846, granted July 27, 1926, to which patent reference may be had, if desired.

The body portion of the oil cup structure includes a substantially cylindrical wall 7 provided at its lower end, at two opposed sides, with two depending spring clamping portions 8, preferably formed integral therewith, as shown. Such clamping portions are adapted to yieldingly engage the side edge portions of one or more of the spring leaves, one leaf in the present embodiment. The mounting of the oil cup structure upon the vehicle spring by snap engagement not only avoids the necessity of perforating or otherwise deforming the spring, with consequent weakening of the same, but also avoids the necessity of providing separate securing means, such as screws or bolts and nuts. Moreover, it enables the oil cup structure to be very easily and quickly applied to and removed from the vehicle spring and without departing from a connection therebetween which is sufficiently secure as to prevent the oil cup structure from becoming loose or detached and lost.

The cylindrical body portion 7 is provided at its upper end with an inwardly extending, substantially horizontal flange 10 which terminates in a depending flange 11. At two diametrically opposed points, portions of flanges 10 and 11 are cut away to provide two openings or passageways 12, through which the locking fingers of the closure are adapted to be passed, as will later appear. The cutting away of portions of said flanges provides two depending flange portions 11 of substantially semi-circular form, and the bottom edges of these flange portions are suitably inclined, as indicated in Fig. 2, to provide cams 13 with which the locking fingers of the closure cooperate in effecting detachable locking connection of the closure and the cup or body portion. At the rear ends of said cams 13, the flange portions 11 are each provided with a depending lug or projection 14, which provide stops for the locking fingers of the closure when said fingers are traveling up the cams 13.

The closure of the structure includes a circular top portion 18 provided with a centrally disposed dome 19 and a depending marginal or skirt portion 20 slightly larger in diameter than the cylindrical body portion 7. Crimped or otherwise suitably secured within said dome is the substantially circular body portion 21 of a locking member which is provided with two opposed, inherently resilient locking fingers 22 extending downwardly and outwardly from said body portion.

The closure is removably applied to the body portion 7 by passing the closure locking fingers 22 down through the passageways 12 of the body portion and thereafter turning said closure in a clockwise direction. This causes the closure locking fingers to ride up the cams 13 of the body portion, the turning movement of the closure being continued until the fingers thereof strike the stop portions 14, which denotes full seating position of the closure. To remove the closure, it is only necessary to turn it in the reverse direction, as will be readily understood.

Arranged within the lower end of the cylindrical body portion 7 is a cup shaped member 25, which constitutes the bottom wall of the oil cup structure. The upwardly extending, annular flange 26 of said member snugly engages the inner surface of the body portion 7, the frictional engagement therebetween being sufficiently great to maintain said bottom member in proper position, especially with the assistance of the weight of the oil within the structure. However, if desired, said flange 26 may be positively secured to the body portion 7, as will be readily understood.

Interposed between the vehicle spring and the bottom wall 25 of the oil cup structure is an oil transmitting member 28 of felt or other suitable material, which member is here shown as being of circular shape and of substantially the same diameter as the oil cup structure. Said oil transmitting member is secured to the bottom wall of the oil cup structure by a split rivet 29, which permits the oil in the body portion 7 to flow to said member. Said member is therefore maintained in a more or less saturated condition so that a sufficient amount of oil is transmitted to the leaves of the spring to keep them in properly lubricated condition. Due to the particular arrangement of the parts, the oil transmitting member is not unduly compressed by the pressure of other parts of the oil cup structure but is maintained relatively soft and yielding and therefore in proper condition for receiving and transmitting oil to the spring.

What I claim is:

1. An oil cup structure, comprising a lubricant receiving container adapted for removable connection to the device to be lubricated, a lubricant transmitting member interposed between said container and said device, and means for securing said member to said container, said securing means being provided with a passage to permit the flow of lubricant from said container to said member.

2. An oil cup structure, comprising a lubricant receiving container adapted for removable connection to the device to be lubricated, a lubricant receiving member interposed between said container and said device, and a hollow rivet for securing said member to said container, said rivet permitting the passage of lubricant therethrough from said container to said member.

3. An oil cup structure, comprising a lubricant receiving container adapted for removable connection to the device to be lubricated, said container being provided with a movable bottom wall, and a lubricant transmitting member interposed between said container bottom wall and said device.

4. Lubricating means, comprising a cap-closed lubricant receiving container provided with opposed integral fingers for snap engagement with the device to be lubricated, said container being provided with a separate substantially cup-shaped bottom wall, a lubricant transmitting member interposed between said device and the bottom wall of said container, and a hollow rivet connecting said member to the bottom wall of said container and permitting the passage of lubricant from said container to said transmitting member.

In testimony whereof I hereby affix my signature.

JAMES S. REID.